United States Patent [19]

Takada

[11] 3,823,565

[45] July 16, 1974

[54] METHOD AND APPARATUS FOR LAYING THERMOPLASTIC PIPE

[75] Inventor: Takezo Takada, Hikone, Japan

[73] Assignee: Takata Kojyo Co., Ltd., Tokyo, Japan

[22] Filed: June 29, 1973

[21] Appl. No.: 374,845

[52] U.S. Cl............ 61/72.1, 61/72.2, 61/72.7, 264/31, 312/236, 425/387 B, 425/392
[51] Int. Cl............ F16l 1/00, E04b 1/16
[58] Field of Search ........ 61/72.1, 72.2, 72.5, 72.6, 61/72.7; 312/236; 425/387 B, 392, 325; 264/94, 31

[56] References Cited
UNITED STATES PATENTS

| | | | |
|---|---|---|---|
| 3,387,065 | 6/1968 | Derbyshire et al. | 264/22 |
| 3,422,631 | 1/1969 | Silverman | 61/72.7 X |
| 3,631,933 | 1/1972 | Bryant | 61/72.2 X |

*Primary Examiner*—Jacob Shapiro
*Attorney, Agent, or Firm*—Wolder & Gross

[57] ABSTRACT

An elongated pipe formed of a normally rigid thermoplastic synthetic organic resin is packaged in a collapsed lay flat condition and in a multilayer state in a heat insulated receptacle having a discharge opening. A chamber is separably coupled to and communicates with the receptacle and houses an air heater, a blower for circulating the hot air through the receptacle and a pair of squeeze rolls for withdrawing and discharging heated softened pipe from the receptacle. The pipe is led by a guide tube into a trench where the pipe is to be laid and an air compressor is connected to the distal end of the pipe to expand the softened discharged pipe, and the laid pipe is cooled to harden it to a rigid state.

18 Claims, 1 Drawing Figure

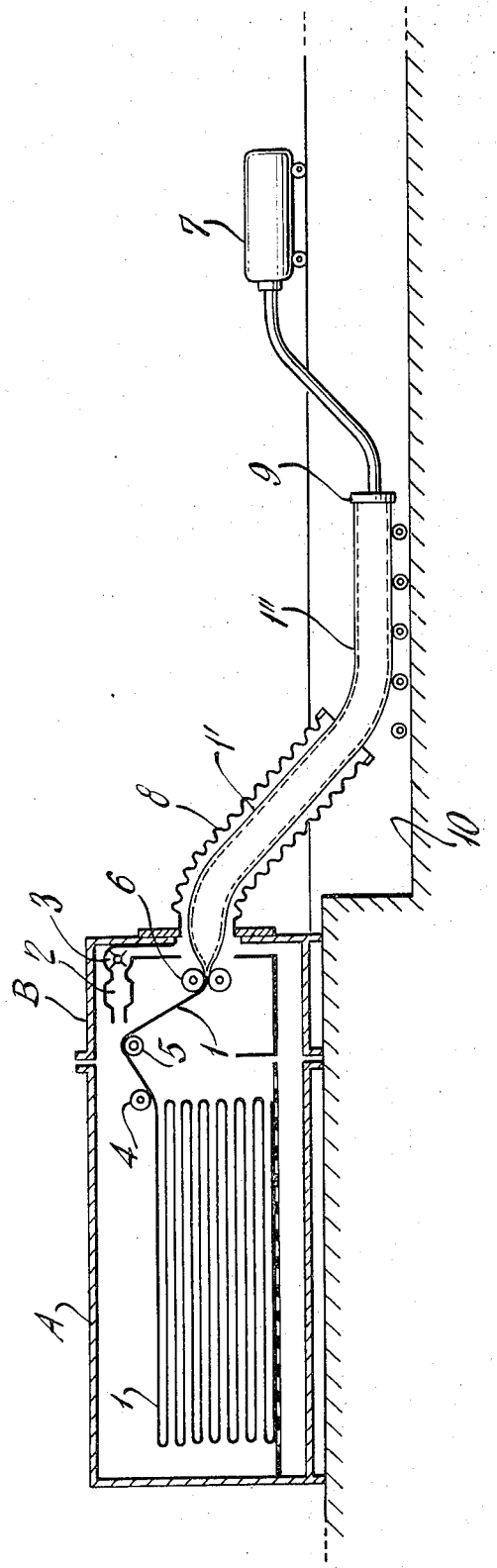

329. 823,565

METHOD AND APPARATUS FOR LAYING THERMOPLASTIC PIPE

BACKGROUND OF THE INVENTION

The present invention relates generally to improvements in the treatment and handling of shaped articles, it relates particularly to an improved process and apparatus for the handling and dispensing of conduit or hollow articles such as pipe, duct, tubing, hose and the like from synthetic organic polymeric resins.

Such conduit articles as pipe, tubing, hose or the like are generally constructed either of an easily flexible and deformable material such as rubber and flexible thermoplastic resins to permit their manipulation in use or application and their storage in a compact condition, for example small diameter hose and the like, or of a rigid self supporting material such as metal, concrete and rigid polymeric resins so as to withstand collapse due to its own weight and external loading such as drain and other water pipes, sewer pipes, conditioning ducts, culverts and the like. In the case of large diameter rigid conduit such as sewer, irrigation and drain pipes and culverts, the conduit is generally produced or fabricated at a central plant and shipped by truck to the point of application and installation. A very large part of the cost involved in the production, installation and application of the rigid conduit is the large expense of the storage and of transportation of the conduit from the production point to the installation point primarily because of the great bulk of the rigid conduit. Flexible or deformable wall conduits cannot be employed because of its mechanical and physical deficiencies and shortcomings. Where the tube is formed of or coated with a latent thermosetting resin which is rapidly set with heat with the expansion and laying of the pipe strains and cracks frequently occur in the pipe permitting leakage and reduced mechanical strength.

SUMMARY OF THE INVENTION

It is a principal object of the present invention to provide an improved process and apparatus for the handling, treating and dispensing of shaped articles.

A further object of the present invention is to provide an improved process and apparatus for the dispensing and handling of large, rigid, hollow self supporting articles such as drain pipes, sewer pipes, conduits, ducts and the like.

Still a further object of the present invention is to provide an improved process and apparatus for the handling, treatment and dispensing of large tubular rigid structures which facilitate the compact storage handling and transportation of such structures prior to the installation and final application thereof.

Another object of the present invention is to provide a process and apparatus of the above nature characterized by their simplicity, low cost, high versatility and adaptability and the improved product resulting therefrom.

The above and other objects of the present invention will become apparent from a reading of the following description taken in conjunction with the accompanying drawing which illustrates a preferred embodiment thereof.

The present invention contemplates the provision of an improved method for the dispensing of long continuous lengths of pipe, such as in the laying of the pipe in the trenches or ditches or the installation of the pipe in other locations, which comprises packaging a pipe formed of a normally relatively rigid thermoplastic synthetic organic resin in a collapsed flattened condition, heating the pipe to a temperature sufficient to render it soft and flexible and pliable without raising the temperature of the resin to its fusion temperature, withdrawing the heated softened pipe from the package and expanding the withdrawn pipe to its normal expanded condition and positioning the pipe in the desired location and thereafter cooling and hardening the pipe.

The pipe is formed in any manner of a suitable thermoplastic synthetic organic polymeric resin, for example, a polyolefin, polyvinyl chloride or the like which is hard under the ambient and internal temperatures at which it is employed, for example, at 20°C to 60°C and is softened on heating. The pipe may be formed in the conventional manner, such as by extrusion or in any other manner, and is advantageously reinforced by natural or synthetic fibers, such as fibers of glass, nylon, polyester or the like, which may be oriented or randomly distributed and may be as loose individual fibers or as a knitted, woven or non-woven webs advantageously of continuous filaments. The pipe as it is produced and still in a warm flexible state is collapsed to a lay flat condition and packaged in a preferably heat insulated shipping container or receptacle with a removable front wall in a compact state, such as in zigzag conditions with successive legs or convolutions completely overlapping.

The packaged collapsed pipe is then shipped from its point of production to the installation location where the container is advantageously coupled to a chamber which communicates with the container and is provided with a pair of driven squeeze rolls for withdrawing the pipe, and heaters and blowers or pumps, for circulating a fluid such as air, water, oil through the heaters and container to soften the pipe. The coupled container and chamber may be stationary or mounted on a truck for advance with the withdrawal of the pipe. The pipe is advantageously expanded by an air compressor whose output is connected by a coupling which hermetically seals the free end of the withdrawn pipe. The heaters are advantageously thermostatically controlled to maintain the heating fluid temperature at a temperature which sufficiently softens the pipe without fusing it. The pipe may be pulled from the chamber while being expanded through a heated flexible guide conduit which maintains the pipe soft to facilitate its shaping and leads it along the line of installation or the chamber may be advanced along the line of installation in synchronism with the withdrawal of the softened pipe.

The present invention also contemplates the provision of the improved apparatus for practicing the above method which includes the packaged collapsed pipe, the pipe heating means and the pipe withdrawl and expansion means.

With the present method and apparatus long continuous lengths of pipe can be shipped, handled and stored in a very compact condition, greatly decreasing transportation and storage costs. The pipe may be laid for great distances without any pipe couplings and may be curved as it is being laid thereby avoiding the need for special fittings, couplings and the like. The installation of the pipe is rapid, simple and inexpensive and the method and apparatus are highly reliable, versatile and adaptable and of great efficiency.

BRIEF DESCRIPTION OF THE DRAWING

The FIGURE of the drawing is a front view, partially in longitudinal section of an apparatus of the present invention illustrating as practicing the process of the present invention in the laying of pipe in a trench.

DESCRIPTION OF THE PREFERRED EMBODIMENT

Referring now to the drawing which illustrates a preferred form of the improved apparatus as applied to the laying of pipe in an elongated ditch or trench 10 which may be dug simultaneously with or before the laying of the pipe, it being understood that the present improved method and apparatus may be applied to installing the pipe in locations other than in trenches or in ditches. The apparatus includes a separable shipping receptacle or container A which is preferably heat insulated and open at its forward end and a chamber B in separable end-to-end relationship and communicating with container A and having a front end discharge opening and a rear opening substantially coinciding with the front end opening in container A. A plurality of shipping containers A are provided each having a detachable wall closing the front opening thereof and having access through the top, the containers being loaded with collapsible pipe.

A perforated horizontal wall is positioned in the container A a short distance above the bottom wall thereof to define therewith a return duct communicating with the bottom of chamber B. Disposed in container A and suitably supported shortly above the perforated wall is a continuous package of pipe 1 in a collapsed lay flat condition formed, as described above, of a thermoplastic synthetic organic polymeric resin which is advantageously fiber reinforced as earlier set forth and which is substantially rigid at the maximum ambient and internal temperatures at which the pipe is to be employed and at above normal atmospheric temperatures, for example 20°C and which may be softened flexible and pliable at elevated temperatures. The package of lay flat collapsed pipe 1 is in a zig-zag form with successive laps of pipe 1 being in superimposed overlying relationship so that with the softening of pipe 1 it may be continuously withdrawn from the package through the end opening in container A. In order to facilitate the withdrawal of pipe 1 from the container A a transverse horizontal guide roll 4 is supported by the container walls just below the top wall and rearwardly of the front end opening. The pipe 1 as advantageously packaged in container A during the production of the pipe and while it is still warm but below its fusion temperature. If the container A is sufficient heat insulated and the pipe 1 is withdrawn and used early enough the subsequent heating of the pipe package to permit the withdrawal and expansion of the pipe may be greatly reduced.

A transverse horizontal guide roll 5 is mounted in chamber B adjacent to the end feed opening and above the level of guide roll 4. Also located in chamber B behind and at the medial level of the front discharge opening are a pair of cooperating horizontal transverse squeeze rolls 6 for withdrawing heated pipe 1 from the package and feeding it through the chamber discharge opening.

An electric motor driven over blower 2 is located in the upper part of chamber B and has an outlet nozzle directed across the top of the guide roll 5 into the top of the container A. A baffle system is provided in chamber B along its bottom and front walls to define conduits which direct air from the bottom conduit in container A across the discharge opening of chamber B and into the inlet of blower 2. Located in the conduit leading to blower 2 inlet are heaters 3 which are preferably electrically energized and thermostatically controlled to achieve an optimum air temperature which can be simply ascertained by one skilled in the art and depends on the material forming the pipe, the pipe dimensions, and its rate of withdrawal.

Secured to the front wall of chamber B and registering with the discharge opening therein is a flexible guide pipe 8 of a diameter greater than that of expanded pipe 1 and provided with a low friction inside surface or freely rotatable guide rolls to permit the free and unimpeded travel of softened expanded pipe 1 therethrough. Also forming part of the apparatus is an easily transportable air compressor 7 which is mounted on wheels and has its outlet connected by a flexible hose to a coupling member 9 which is separably attached to the distal free end of the finished pipe 1″ to effect a hermetically sealed connection between the compressor 7 and the interior of pipe 1″. It should be noted that while container A and chamber B are shown as being stationary on the ground, they may advantageously be positioned on a suitable wheeled truck or carriage which may be self propelled to facilitate the advance of container A and chamber B synchronously with the discharge of pipe 1″ alternatively to the advance of compressor 7. Moreover, at each location of chamber B a plurality of containers A of pipe can be handled and the chamber B can be transferred to successive stations where pipe holding containers A have been previously delivered.

Considering now the application of the apparatus described above in practicing the present method, the preformed pipe 1 of the nature and character set forth above is packaged in a collapsed lay flat condition in container A. If the pipe 1 is initially at its rigid temperature container A is coupled to chamber B and blower 2 and heater 3 are energized to effect the circulation of hot air through container 1 and back to the input of blower 2. When the temperature of the leading laps of pipe 1 has been raised to the pipe softening temperature, as may be readily determined, pipe 1 is withdrawn under guide 4 and over guide roll 5 into the nip of squeeze rolls 6 which are positively driven to feed the softened pipe through the chamber discharge opening and guide pipe 8 into trench 10. The leading end of the advanced pipe is connected by way of coupling 9 to the outlet of compressor 7 to blow the pipe 1′ to its fully expanded condition, the squeeze rolls 6 preventing the passage of air through pipe 1′ past the squeeze rolls into the pipe in container A. The expanded pipe 1″ deposited into the trench 10 is permitted to cool to its rigid state and cool air is advantageously circulated around the pipe by means of a suitable blower to accelerate the cooling of the pipe. It should be noted that by reason of the insulated guide pipe and the manner in which the hot air is circulated the pipe 1′ travelling through guide pipe 8 is maintained in a suitably flexible state and may be guided to the path of installation which may be at various levels. Furthermore, by reason of the direction of flow of the heated air as effected by the blower outlet nozzle, the pipe 1′ is at a higher temperature than the heated package pipe 1" facilitating the expansion of the pipe 1'. As the pipe 1" is fed from guide pipe 8 it is pulled along trench 10 in synchronism therewith and the compressor similarly advanced. As a preferable alternative, the container A and chamber B are mounted on a truck which progresses rearwardly with the discharge of pipe 1" so that the pipe 1" need not be pulled along the trench and compressor 7 may remain stationary.

While there has been described and illustrated a preferred embodiment of the present invention it is apparent that numerous alterations, omissions and additions may be made without departing from the spirit thereof.

I claim:

1. The method of dispensing a long length of a relatively rigid pipe comprising the steps of packaging a pipe formed of a thermoplastic resin material which is relatively rigid at room temperature in a collapsed flattened condition, heating said pipe to a temperature to soften said pipe, withdrawing said relatively soft pipe from said package and expanding said softened pipe and thereafter cooling said expanded pipe to harden said expanded pipe.

2. The method of claim 1 wherein said material comprises a thermoplastic synthetic organic polymeric resin and is reinforced by a fibrous web embedded therein.

3. The method of claim 2 wherein said fibrous web is formed of woven continuous filaments.

4. The method of claim 1 wherein said softened pipe is extended by introducing a fluid under pressure into the interior of said pipe.

5. The method of claim 4 wherein said fluid is air and is introduced through the distal end of said pipe during the withdrawal thereof.

6. The method of claim 1 wherein said pipe is disposed in its softened state in a desired position before the cooling and hardening thereof.

7. The method of claim 4 including the steps of digging a trench and laying said pipe in a softened state in said trench during the withdrawal and before the cooling and hardening thereof.

8. The method of claim 6 wherein said pipe is exposed to a forced circulation of cooling air after the positioning thereof.

9. The method of claim 6 including the step of maintaining said expanded withdrawn pipe in a heated softened state during its advance to said desired position.

10. The method of claim 1 wherein said material comprises a thermoplastic synthetic organic polymeric resin.

11. An apparatus for practicing the method of claim 1 comprising a package of pipe in a collapsed state and formed of a synthetic organic polymeric resin which is relatively rigid at room temperature, means for heating said package of pipe to soften said resin, means for withdrawing and dispensing said softened pipe from said package and means for expanding said softened pipe as it is withdrawn from said package.

12. The apparatus of claim 11 including a first chamber housing said package of pipe, said heating means comprising means for circulating hot air through said first chamber.

13. The apparatus of claim 11 wherein said pipe withdrawing means comprises a pair of squeeze rolls engaging opposite faces said softened collapsed pipe and said pipe expanding means comprises a compressor and coupling means for connecting the output of said compressor to the distal end of said pipe and for hermetically sealing said distal end.

14. The apparatus of claim 11 wherein said first chamber has an end opening therein and including a second chamber separably coupled to said first chamber and having an end opening registering with said first chamber end opening, said heating means comprising a blower located in said second chamber for circulating air through said first chamber and means for heating said air, said second chamber having a discharge opening and said withdrawing means comprises a pair of driven squeeze rolls for withdrawing soften collapsed pipe from said package and feeding it through said discharge opening.

15. The apparatus of claim 14 wherein said first chamber is separably coupled to said second chamber and defines a shipping container for said pipe package.

16. The apparatus of claim 12 wherein said first chamber is separably coupled to said heating means and defines a container for transporting and storing said pipe package.

17. The apparatus of claim 11 comprising means including a flexible guide conduit, having a discharge opening movable to different positions for directing said softened pipe to said different positions while maintaining said pipe at an elevated temperature softened state during its advance to said discharge opening.

18. The apparatus of claim 16 wherein said container includes a separable end wall providing access to the interior of said first chamber.

* * * * *